United States Patent [19]

Walton

[11] Patent Number: 4,546,241

[45] Date of Patent: Oct. 8, 1985

[54] ELECTRONIC PROXIMITY IDENTIFICATION SYSTEM

[76] Inventor: Charles A. Walton, 19115 Overlook Rd., Los Gatos, Calif. 95030

[21] Appl. No.: 448,516

[22] Filed: Dec. 10, 1982

[51] Int. Cl.$^4$ .............................................. G06K 5/00
[52] U.S. Cl. ................................ 235/380; 343/6.5 SS
[58] Field of Search .................. 235/380; 343/6.55 SS

[56] References Cited

U.S. PATENT DOCUMENTS

| | | | |
|---|---|---|---|
| 3,806,874 | 4/1974 | Ehrat | 235/380 |
| 4,019,181 | 4/1977 | Olsson | 343/6.5 SS |
| 4,069,472 | 1/1978 | Kamata | 343/6.5 SS |
| 4,242,663 | 12/1980 | Slobodin | 235/380 |
| 4,333,078 | 6/1982 | Henoch | 343/6.5 SS |
| 4,384,288 | 5/1983 | Walton | 235/380 |
| 4,388,524 | 6/1983 | Walton | 235/380 |
| 4,399,437 | 8/1983 | Falck | 235/380 |

*Primary Examiner*—Harold I. Pitts
*Attorney, Agent, or Firm*—Gerald L. Moore

[57] ABSTRACT

An electronic identification and recognition system including a portable card having a circuit therein for generating and transmitting and identifying signal comprising predetermined frequency pulses. The card functions in cooperation with a reader which radiates a radio frequency carrier signal received by an antenna in the card. This signal is used both to power the circuit of the card and to provide the basic frequency signal which is modified to generate secondary frequency signals which are transmitted back to the reader in a predetermined sequence identifying the card.

8 Claims, 2 Drawing Figures

ELECTRONIC PROXIMITY IDENTIFICATION SYSTEM

FIELD OF THE INVENTION

This invention relates to identification systems of the type having a stationary reader and a plurality of portable cards each capable of individually identifying the bearer.

RELATED PATENTS AND APPLICATIONS

U.S. Pat. No. 3,752,960, Electronic Identification and Recognition System issued on Aug. 14, 1973 with Charles A. Walton as inventor;

U.S. Pat. No. 4,223,830, Identification System issued on Sept. 23, 1980 with Charles A. Walton as inventor;

U.S. Pat. No. 4,236,068 Personal Identification and Signalling System issued on Nov. 25, 1980 with Charles A. Walton as inventor.

BACKGROUND OF THE INVENTION

As illustrated by the above related patents, it is known to provide an electrical circuit incorporated in an identification card for identifying the bearer of the card. It is also known to provide means in the card circuit for sending a signal back to the receiver, which signal is individually encoded in a manner to identify the card holder from all other card holders. In such previous devices the circuit has either acted passively, that is, has resonated at a fixed frequency in response to a sweeping frequency, or in the alternative, has incorporated a battery and oscillator for generating a specific frequency not necessarily the same as that sent by the receiver. However, in examples where the card has included an oscillator, a power source has been provided to drive the oscillator, and there then exists the added technicalities of phase locking the receiver to the card-generated signal and providing a battery source within the card. The battery must have a useful life to give the card a sufficient longevity while not being overly large so as to require the card to be bulky.

An oscillator on the card has the difficulty of needing a crystal for stability, with consequent bulk and cost; or if no crystal then some means for frequency stability even with a fluctuating voltage power supply.

It is the purpose of the present invention to provide a card which generates a signal which is individually encoded to identify each particular card separate from the others and yet requires no built-in power source.

It is another purpose of the present invention to provide a card capable of generating an identification signal which is easily detectable by the reader and which rejects noise.

It is another purpose to provide a card needing no oscillator.

SUMMARY OF THE INVENTION

An electronic identification system comprising a reader capable of generating and radiating a radio signal of a predetermined characteristic and including a circuit for detecting and decoding a radiated signal, and a portable identification card including a circuit capable of being powered and activated by the reader-radiated signal and including an encoding means for modifying said signal received from the reader for identification.

DESCRIPTION OF THE INVENTION

Figure 1:
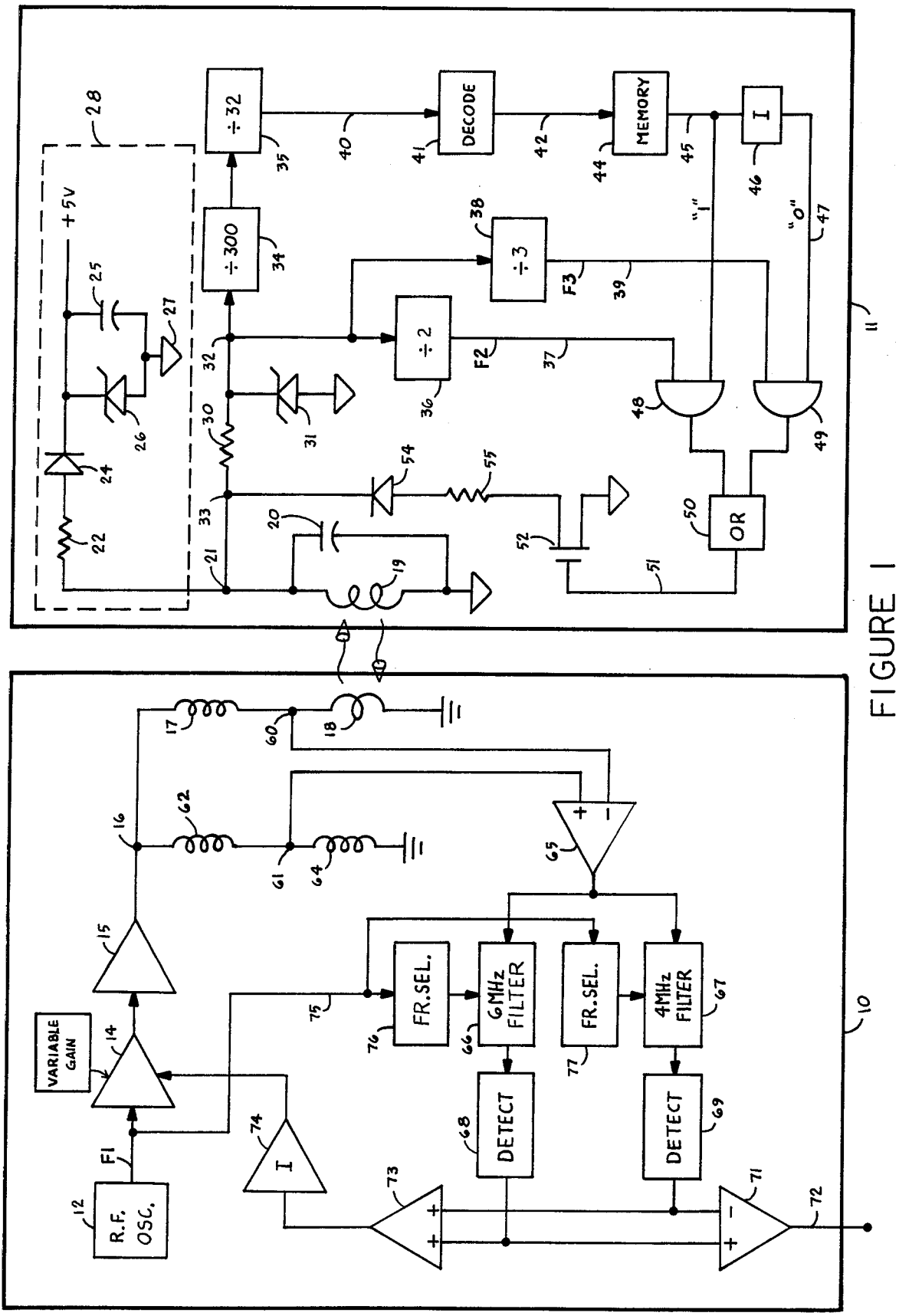
FIG. 1 shows circuit diagrams of one type suitable for use in the reader and the card.

Shown in FIG. 1 are the circuit diagrams for a typical reader 10 and a cooperating card 11. The card can be of a standard size such as a credit card and can serve such purposes as identifying the bearer for making financial transactions, for entering restricted areas, or for identifying packages to which the card is attached. The reader 10 has the general function of the energizing and interrogation of the card by activating it in a manner to cause the transmission of a signal by the card. The signal of the card includes a particular identifying code for that card only. Thus each card of a total system would have a separate and distinct identifying code which is received and decoded by the reader.

The reader 10 includes a radio frequency oscillator 12 which generates a carrier frequency (F1) which is sent to a variable gain amplifier 14. The frequency F1 of the oscillator signal is assigned a value of 12 Megahertz for purposes of this description, however in practice the frequency can be in any suitable range such as 13.5 Mhz which is in the IMS band where high powers can be transmitted without a license from Federal Communications Commission. Frequency F1 is the carrier frequency. The signal F1 thereafter passes through a power amplifier 15 and an inductor 17 to a radiating coil or antenna 18. Typically the coil 18 is a loop antenna for radiating the RF signal to the card 11.

Radiation from the antenna 18 is received by the card 11 at the antenna 19 which resonates with a capacitor 20 at the radiated frequency F1. This carrier signal appears as a sine wave voltage at the node 21. The voltage at node 21 is transmitted through a resistor 22 and a diode 24 to a capacitor 25 and a zener diode 26. These elements serve to rectify and store power from the signal of a sufficient amount to operate the circuits of the card yet to be explained. This power supply is referenced to the junction 27 which is the ground of the card indicated by the open triangle symbol. Thus the components just described form a power supply 28 which generates power from the signal F1 received at the antenna 19.

The carrier signal F1 at the node 21 also is transmitted through a resistor 30 to a zener diode 31 and to a node 32. The signal at the node 32 is a 12 Mhz voltage clamped to a working level by the zener diode. The node 32 signal drives a divider 34 which in this illustration divides by 300 to deliver a signal F4 (40 Kilohertz) to a counter 35. The voltage at the node 32 also drives a third divider 36 which produces a signal F2 (6 Mhz) on the line 37 which half selects the And gate 48. Similarly a fourth divider 38 supplies to the line 39 a signal F3 at 4 Mhz, by dividing the carrier signal F1 by 3. Line 39 half selects And gate 49.

For purposes of description, the secondary frequencies have been chosen as integral fractions of the carrier, namely one-half and one-third. The secondary frequencies might bear some other relation to the carrier, such as being larger or smaller than the examples of one-half and one-third. The secondary signals modulate the carrier in the manner now to be described. The secondary frequencies carry the encoded data, in the manner now about to be described.

The counter 35 counts through its values which is equivalent to the number of code positios which in this example is 32. The code positions are transmitted over the group of wires 40 and decoded by the decoder 41 to 32 wires in the group 42. The group 42 of wires is selectively cut within the encoder memory 44 in accordance with the coded data which is desired to be transmitted by this particular card. In other words the memory 44 provides the code which identifies this card. Other methods can be used for encoding the card, such as the selective burning of diodes or by latch circuits, or by ROM, EPROM, RAM or other semiconductor memories. Additionally, the memory can be set at the time of manufacture or it can be set or changed after manufacture depending upon when the code of the card is determined.

The memory transmits a pulse signal on the line 45 which rises and falls at the pulse rate F4 (40 Khz), with the rising and falling being determined by the value of the encoded data in the memory. The complement of the signal on the conductor 45 is obtained by passage of the signal through an inverter 46, the output of which appears on line 47. For a datum bit of "1" from memory 44 line 45 is Up, thus half-selecting And Gate 48; and line 47 is Down, thus not selecting And Gate 49. For a datum bit of "0" from memory 44, line 45 is Down, thus not selecting And Gate 48; and line 47 is Up, thus half-selecting And Gate 49. Thus a series of ones and zeros are transmitted respectively on the lines 45 and 47 to the And Gates 48 and 49. These ones and zeros are interspersed in accordance with the code recorded in the memory 44. The And Gates 48 and 49 control the output signals F2 and F3 respectively depending upon the code recorded in the memory 44. The output signals F2 and F3 from the And Gates 48 and 49 are merged in Or Gate 50 and appear on line 51. Line 51 drives the control element of modulation transistor 52. Transistor 52 in series with diode 54 and resistor 55 is connected to node 33 and across the antenna loop 30. Node 33 is equal to node 21. The transistor 52 modulates the carrier signal from the node 33 through the diode 54 and a resistor 55. The carrier signal F1 at 33 is loaded or reduced in amplitude as the transistor 52 conducts. The resistor 55 determines the percentage of modulation of the signal and the diode 54 allows modulation of either the positive or the negative half-cycle of the signal. In this instance the negative half-cycle is preferred to be modulated because the negative side has the least effect on the drive signal supplied to the counter 34 or the drive signal to the power supply 28.

Figure 2:
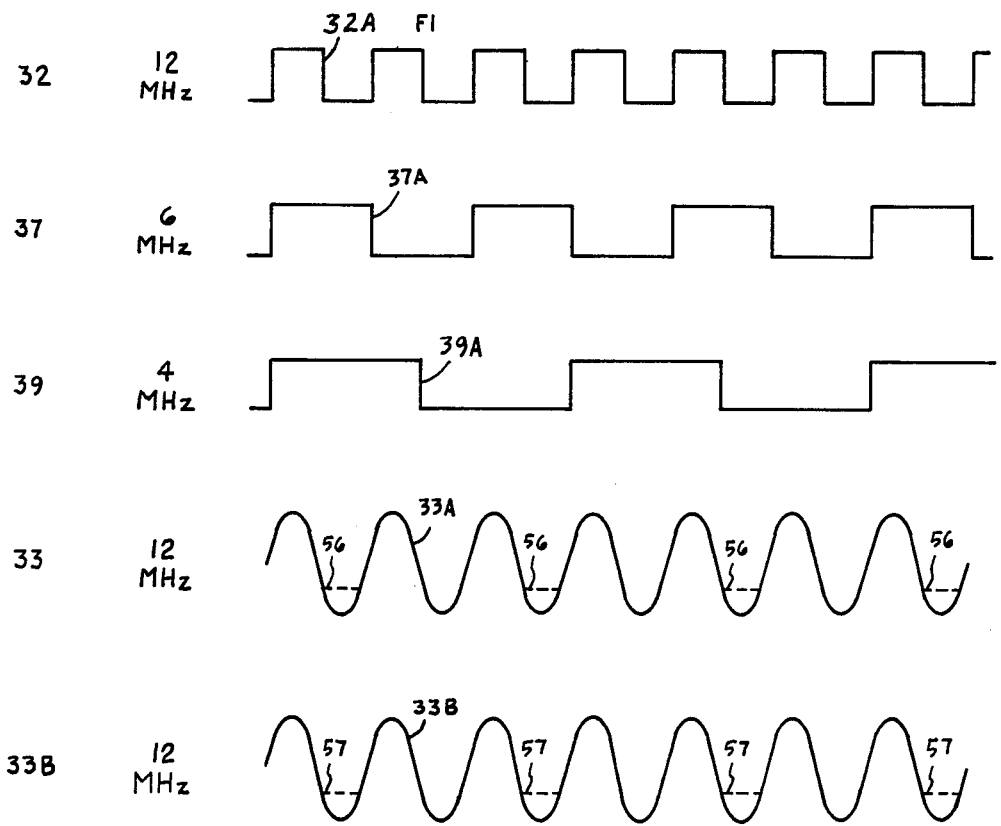
FIG. 2 shows wave forms for the card circuit.

Referring now to FIG. 2 the square wave signal 32A is illustrated as being 12 Mhz appearing at the node 32. The signal 37A appears on the conductor 37 while the signal 39A appears on the conductor 39. Thus it can be seen that the signal F1 is divided by two and by three (by the dividers 36 and 38) respectively to generate the signals. Thus the signal 37A is 6 Mhz and the signal 39A is 4 Mhz in the example.

Continuing with FIG. 2, at node 33 is sine wave 33A. If the datum being transmitted is a "1", F2 represented by line 37 is the voltage selected to be applied to modulation transistor 52. The effect of turning on transistor 52 is to truncate the sine wave 33A as shown by the dotted line 56. Note that whenever line 37 is Up and the sine wave 33A is Down, the sine wave 33 is truncated or clipped. This truncation is modulation, and a receiver sensitive to activity at the antenna 30 of the card 11 will receive F2 signals, and also F1 minus F2, and F1 plus F2. Next, suppose a "0" is being transmitted, and frequency F3 has been selected for modulation. Frequency F3 is shown on line 39, and the effect of its modulatin on node 33 is shown in line 33B. Note that whenever line 39 is Up, and consequently modulation transistor 52 is On, and at the same time wave 33 is Down, then sine wave 33 is truncated, as shown at dotted line 57. The wave 33 is now modulated by frequency F3. Present in the signals radiated from antenna 30 are carrier frequency F1, and secondary frequency F3, as well as the sum and difference signals F1 plus F3, and F1 minus F3. Note that wave 33B shows a truncation every third negative wave, whereas wave 33A shows a truncation every second negative wave.

Return to FIG. 1. The signal from antenna 30 is received by the antenna 18 of the reader and appears at the node 60. The signal contains the frequencies F2 and F3 as well as the carrier frequency F1 and the sum and difference frequencies. At the node 61 of the inductors 62 and 64 there is a portion of the carrier signal F1 and this portion is chosen to be close in amplitude to the portion of the carrier present at the node 60. The nodes 60 and 61 are connected to a differential amplifier 65, which cancels out the signal F1 leaving the output thereof as being principally the frequency F2 and F3 and the sum and difference frequencies. In this manner the secondary frequencies are brought to the receiver system and the inductors 17, 62 and 64 together with the inductance of the antenna 18 act as a bridge circuit to suppress the carrier frequency.

The output of the differential amplifier 65 is fed to filters 66 and 67 which are tuned to the frequencies F2 (6megahertz) and F3 (4 megahertz) such that these filters emit a signal when their tuned frequencies are present. One or the other of these frequencies is present according to the data recorded in the memory 44 of the card as previously described. The outputs of the filters are detected by detectors 68 and 69. The bandpass of the detectors is that of the bit rate, or 40 Khz in this example. The two detector outputs go to the differential amplifier 71 which rejects noise pulses which are common to both lines. The output of the amplifier 71 is positive for a "1" and negative for a "0".

The amplifier 65, plus filter 66 and detector 68, together comprise a radio receiver. The receiver is tuned to a fixed frequency. In fact, a radio frequency receiver may be used for this function. For high quality selective filtering, the superheterodyne feature may be used for this radio receiver. Similarly, amplifier 65, filter 67 and detector 69 form a radio receiver, in this case tuned to frequency F3.

The outputs of the detectors 68 and 69 are also fed to a summing amplifier 73 forming a total signal indicating the strength of the signal received from the card. The output signal from the amplifier 73 is inverted in a non-linear manner by the inverter 74 and applied as a gain control signal to the amplifier 14 to modify the amplitude of the original signal F1. In this manner the signal strength is varied responsive to the signal strength received back from the card so as not to overload the card circuits by transmitting excessive drive power. The risk of overload occurs when the card is too close to the reader.

The filters 66 and 67 may simply be tuned to the two data frequencies F2 and F3 and may be of design equivalent to the front end of a superheterodyne receiver. However, rejection of spurious radio signals and high selectivity is possible by connecting these filters to use synchronous detection at the desired filtering frequency. To achieve this the reference frequency F1 is supplied by line 75 to frequency selectors 76 and 77 which generate the desired filter frequency in the same manner as the card generates frequencies, including sidebands.

The filter frequencies may also be the sidebands F1+F2 or F1−F2; and F1+F3 or F1−F3.

To summarize the operation, the reader radiates a radio frequency carrier which is received by the loop antenna of the card. The signal is strong enough to power the card thereby energizing the various circuits. The incoming signal F1 also is transmitted to the various counters which emit pulses at some sub-multiple, also called integral division, of the carrier frequency signal. In the present instance described the carier frequency is 12 megahertz and the secondary frequencies generated in the card are F2 (6 megahertz), F3 (4 megahertz), and F4 (40 kilohertz). The secondary frequencies F2 and F3 are selected by the encoding circuit and applied to the carrier frequency signal to attenuate selected periodic waves thereof. At the card antenna there exists the carrier F1, modulation signals F2 and F3, and sidebands which are the sum and difference of F1 and F2, and F1 and F3. This modulated carrier frequency is radiated from the card antenna back to the reader.

The reader, upon receiving the modulated carrier frequency, separates the secondary frequencies from the carrier frequency and thereafter individually amplifies, filters and detects the secondary frequency signals. The secondary frequencies after detection represent the data sent by the card.

Encoding within the card involves a counter which counts a fixed quantity of carrier pulses and emits a pulse for each full count, and a counter which advances on each pulse. Each pulse corresponds to a bit. This bit signal advances a decoder through a number of memory positions. Each memory position is encoded to represent a one or a zero depending upon the identification assigned the card. The value of each bit determines which of the secondary frequency signals is applied to the carrier signal and hence which of the secondary frequencies and side bands are generated and radiated in the signal sequence. When this modulated carrier signal is transmitted to the reader, a sequence of complementary bits, i.e., ones and zeros equal to the encoded data on the card result which can be compared to previously recorded signals to identify the card.

Thus it can be seen that the carrier frequency is used to energize the circuits of the card for the generation and transmission of the card identification signal. Because this signal is the carrier frequency in a modulated form it is automatically the same frequency as the carrier signal thereby doing away with requirement for frequency detection and phase locking in the card or reader. By separating the secondary frequency signals from the carrier signal by integral fraction multiples of the carrier frequency detection of the secondary signals is made easier. The synchronous detection of the data signals permits the deletion of spurious or noise signals from the data signal. Further, the use of two frequencies F2 and F3 in complementary form provides data redundancy and allows further noise reduction. Also by regulating the amplitude of the output signal from the reader responsive to the feedback signal from the card, errors are avoided which might be introduced by overloading of the card or reader.

The invention claimed is:

1. An electronic identification system comprising:
   a reader including means to generate, radiate and identify a carrier frequency signal; and
   an identification card having an electronic circuit and comprising;
   means to receive said carrier frequency signal radiated by said reader;
   means to generate power from said carrier frequency signal to energize said card electronic circuit;
   a counter to receive and generate secondary radio frequency signals by dividing said carrier frequency signal;
   a data memory for recording an identification code identifying said card;
   means to access said data memory and select said secondary radio frequency signals responsive to said identification code; and
   an antenna connected to receive and radiate said selected secondary radio frequency signals to said reader to allow said reader to identify said card.

2. An electronic identification system as defined in claim 1 wherein said means to select said secondary radio frequency signals both selects said secondary radio frequency signals and transmits them to said antenna in an order responsive to the identification code recorded in said data memory.

3. An electronic identification system as defined in claim 1 wherein said counter divides said carrier frequency signal by whole numbers.

4. An electronic identification system as defined in claim 2 including means to generate additional secondary frequency signals which are equal to the sum or difference of said carrier frequency signal and said secondary frequency signals.

5. An electronic identification system as defined in claim 2 in which the means to select loads selected ones of said secondary radio frequency signals on said card antenna for radiation to said reader.

6. An electronic identification system as defined in claim 2 wherein said reader includes means to vary the amplitude of said carrier frequency signal responsive to the amplitude of the secondary radio frequency signals received by the reader.

7. An electronic identification system as defined in claim 1 wherein said reader includes means to generate frequency signals equal in frequency to said secondary frequency signals received from said card for synchronous detection of said secondary frequency signals.

8. An electronic identification system as defined in claim 4 wherein said reader includes means to generate signals equal in frequency to said additional secondary frequency signals generated by said card for the synchronous detection of said additional secondary frequency signals.

* * * * *